United States Patent
Zaccaria et al.

(10) Patent No.: US 10,494,115 B2
(45) Date of Patent: Dec. 3, 2019

(54) SYSTEM AND METHOD FOR STARTING THE ENGINES OF A TWIN-ENGINE AIRCRAFT

(71) Applicants: Airbus Operations SAS, Toulouse (FR); Airbus SAS, Blagnac (FR)

(72) Inventors: Patrick Zaccaria, Grisolles (FR); Pierre-Henri Brousse, Ramonville (FR); Alexis Manneville, Toulouse (FR); Paul-Emile Roux, Toulouse (FR); Damien Lozach, Colomiers (FR); Christine Molliet, Toulouse (FR)

(73) Assignees: AIRBUS OPERATIONS SAS, Toulouse (FR); AIRBUS SAS, Blagnac (FR)

( * ) Notice: Subject to any disclaimer, the term of this patent is extended or adjusted under 35 U.S.C. 154(b) by 508 days.

(21) Appl. No.: 15/434,284

(22) Filed: Feb. 16, 2017

(65) Prior Publication Data

US 2017/0233089 A1     Aug. 17, 2017

(30) Foreign Application Priority Data

Feb. 16, 2016 (FR) ..................................... 16 51238

(51) Int. Cl.
| | |
|---|---|
| *B64D 31/12* | (2006.01) |
| *F02C 7/264* | (2006.01) |
| *F02C 7/27* | (2006.01) |

(52) U.S. Cl.
CPC ............. *B64D 31/12* (2013.01); *F02C 7/264* (2013.01); *F02C 7/27* (2013.01);
(Continued)

(58) Field of Classification Search
CPC .......... B64D 31/12; F02C 7/264; F02C 7/268; F02C 7/27; F02C 7/26; F05D 2220/323; F05D 2260/85
See application file for complete search history.

(56) References Cited

U.S. PATENT DOCUMENTS

| | | | |
|---|---|---|---|
| 2002/0173897 A1* | 11/2002 | Leamy ...................... | F02C 9/28 701/100 |
| 2006/0168968 A1* | 8/2006 | Zielinski ................. | F02C 7/262 60/778 |

(Continued)

FOREIGN PATENT DOCUMENTS

EP          1258618        11/2002

OTHER PUBLICATIONS

French Search Report, dated Oct. 26, 2016, priority document.

*Primary Examiner* — Carlos A Rivera
(74) *Attorney, Agent, or Firm* — Greer, Burns & Crain, Ltd.

(57) ABSTRACT

A system and a method for the automatic starting of the engines of a twin-engine aircraft. When a first engine is made by the pilots of the aircraft to follow an automatic starting procedure, this engine follows the conventional four-phase starting cycle. The rotor of the high-pressure stage of the second engine is spun up for a predetermined duration and to a speed that is substantially constant and less than the nominal value during the starting cycle for the first engine. Once the starting cycle for the first engine is complete, the second engine is made by the pilots of the aircraft to follow an automatic starting procedure. The starting cycle for the second engine comprises just three phases.

7 Claims, 2 Drawing Sheets

(52) U.S. Cl.
CPC .... *F05D 2220/323* (2013.01); *F05D 2240/20* (2013.01); *F05D 2260/85* (2013.01)

(56) References Cited

U.S. PATENT DOCUMENTS

| | | | | |
|---|---|---|---|---|
| 2013/0086919 A1* | 4/2013 | Dooley | ............... | F02C 7/26 60/778 |
| 2014/0373552 A1* | 12/2014 | Zaccaria | ............ | F02C 7/277 60/778 |
| 2014/0373553 A1* | 12/2014 | Zaccaria | ............ | F02C 7/277 60/778 |
| 2017/0233103 A1* | 8/2017 | Teicholz | ............ | B64D 27/16 701/100 |
| 2017/0234230 A1* | 8/2017 | Schwarz | ............ | F02C 7/268 60/778 |
| 2017/0234238 A1* | 8/2017 | Schwarz | ............ | F02C 7/268 60/778 |

\* cited by examiner

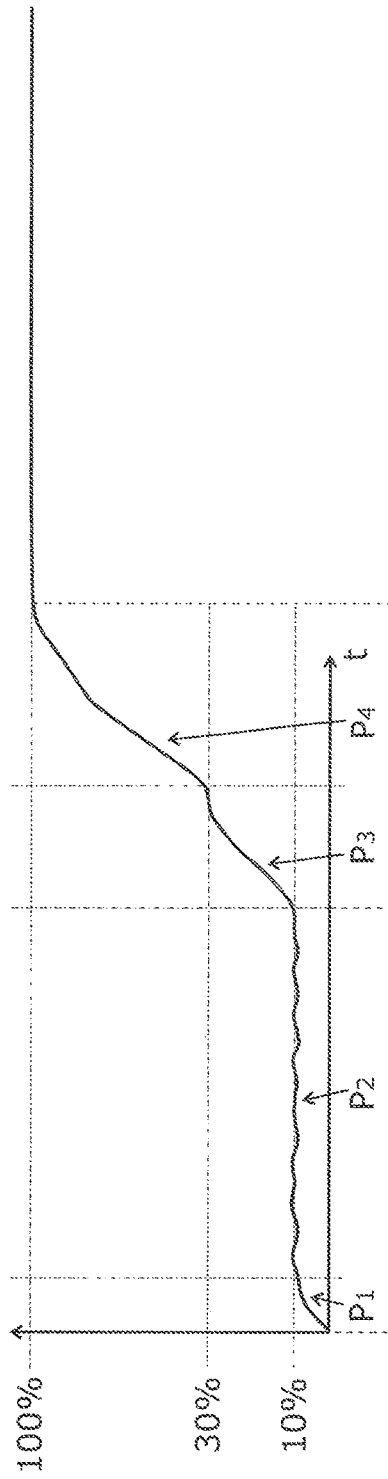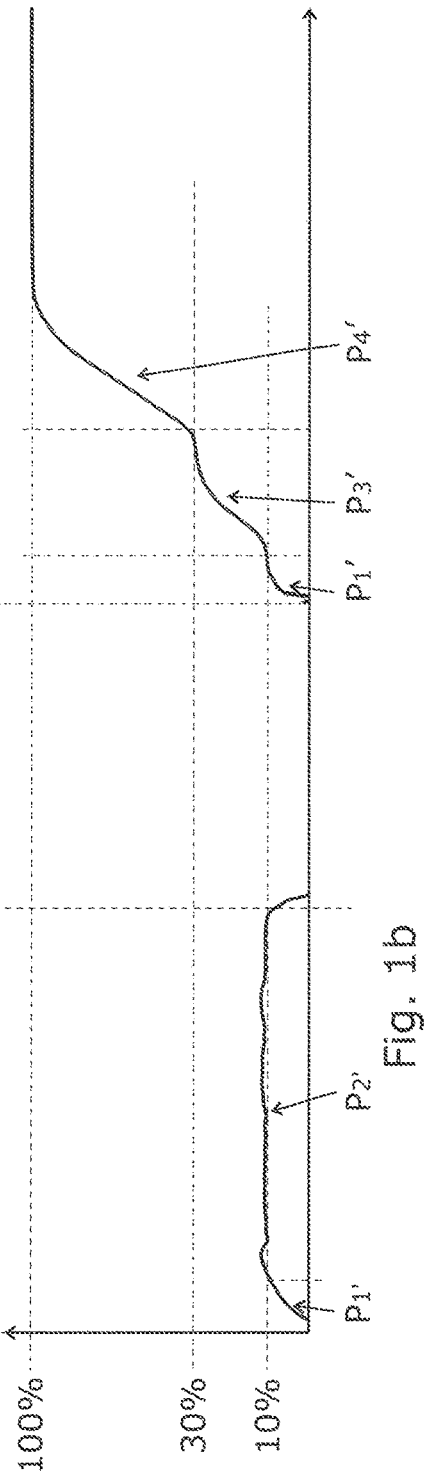

SYSTEM AND METHOD FOR STARTING THE ENGINES OF A TWIN-ENGINE AIRCRAFT

CROSS-REFERENCES TO RELATED APPLICATIONS

This application claims the benefit of the French patent application No. 1651238 filed on Feb. 16, 2016, the entire disclosures of which are incorporated herein by way of reference.

BACKGROUND OF THE INVENTION

The present invention relates to a system and a method for starting the engines of a twin-engine aircraft.

Between two flights of an aircraft, the time that elapses between disembarkation and boarding is between thirty minutes and one hour. During this time, the airplane engines which are stopped remain hot and do not have time to cool completely before the next take-off and so a residual thermal gradient at the rotors of the engines causes the rotor shaft to expand (this being the phenomenon referred to as "bowed rotor"). At the restart, if the engine has not had time to cool sufficiently, some of the tips of the rotor blades may rub against the casing.

It is known practice, in order to prevent this phenomenon, to proceed, when starting an engine, with spinning up of a rotor of the high-pressure stage of the engine (rotor N2) progressively with a holding stage during which the rotational speed of said rotor is limited, for example to approximately 10% of a nominal rotational speed (this limit is dependent on the type of engine).

The purpose of the holding stage is to allow the temperature of the rotor to become uniform, and this stage may last up to 5 minutes. Therefore, when the two engines are started in succession as the regulations demand, it is necessary to wait for a minimum of 10 minutes after boarding the passengers before the two engines are fully operational for take-off.

SUMMARY OF THE INVENTION

There is a need to optimize the startup times for the engines of a twin-engine aircraft in order to limit the length of time for which the aircraft is immobilized on the ground, while at the same time limiting the "bowed rotor" phenomenon. To this end, the invention relates to a method for the automatic starting of a twin-engine aircraft, the aircraft comprising a first and a second engine each having a high-pressure stage comprising at least one rotor, the starting method comprising the automatic starting of a first and then of a second engine, the starting of the first engine comprising implementing a starting cycle that takes place in four successive phases, these being:

a phase, referred to as the starting phase, in which at least one rotor of the high-pressure stage of the first engine is spun up via a compressed-air-generating source;

a phase, referred to as the holding phase, in which the rotational speed of the at least one rotor of the first engine is held at a speed that is substantially constant and less than a nominal value for a predetermined duration;

a phase, referred to as the ignition phase, in which combustion of an air-fuel mixture is initiated in the first engine; and a phase, referred to as the run-up phase, in which the rotational speed of the at least one rotor of the first engine is increased until it reaches the nominal value, concomitantly with the starting cycle for the first engine, at least one rotor of the high-pressure stage of the second engine is spun up for a predetermined duration, using the compressed-air-generating source, to a speed that is substantially constant and less than the nominal value, and once the run-up phase of the starting cycle for the first engine is complete, the second engine is started (by the pilot), the starting of the second engine consisting in implementing a starting cycle that takes place in three successive phases, these being:

a starting phase in which at least one rotor of the high-pressure stage of the second engine is spun up via a compressed-air-generating source;

an ignition phase in which combustion of an air-fuel mixture is initiated in the second engine; and a run-up phase in which the rotational speed of the at least one rotor of the second engine is increased until it reaches the nominal value.

BRIEF DESCRIPTION OF THE DRAWINGS

Further advantages and features of the invention will become apparent from the nonlimiting detailed description hereinbelow. This description will be given with reference to the attached drawings, among which:

FIGS. 1a and 1b are graphs representing the rotational speed as a function of time for a rotor of a high-pressure stage of a first aircraft engine (FIG. 1a) and of a second aircraft engine (FIG. 1b) which are started in succession implementing a starting method according to the invention.

DETAILED DESCRIPTION OF THE PREFERRED EMBODIMENTS

Figure 2:
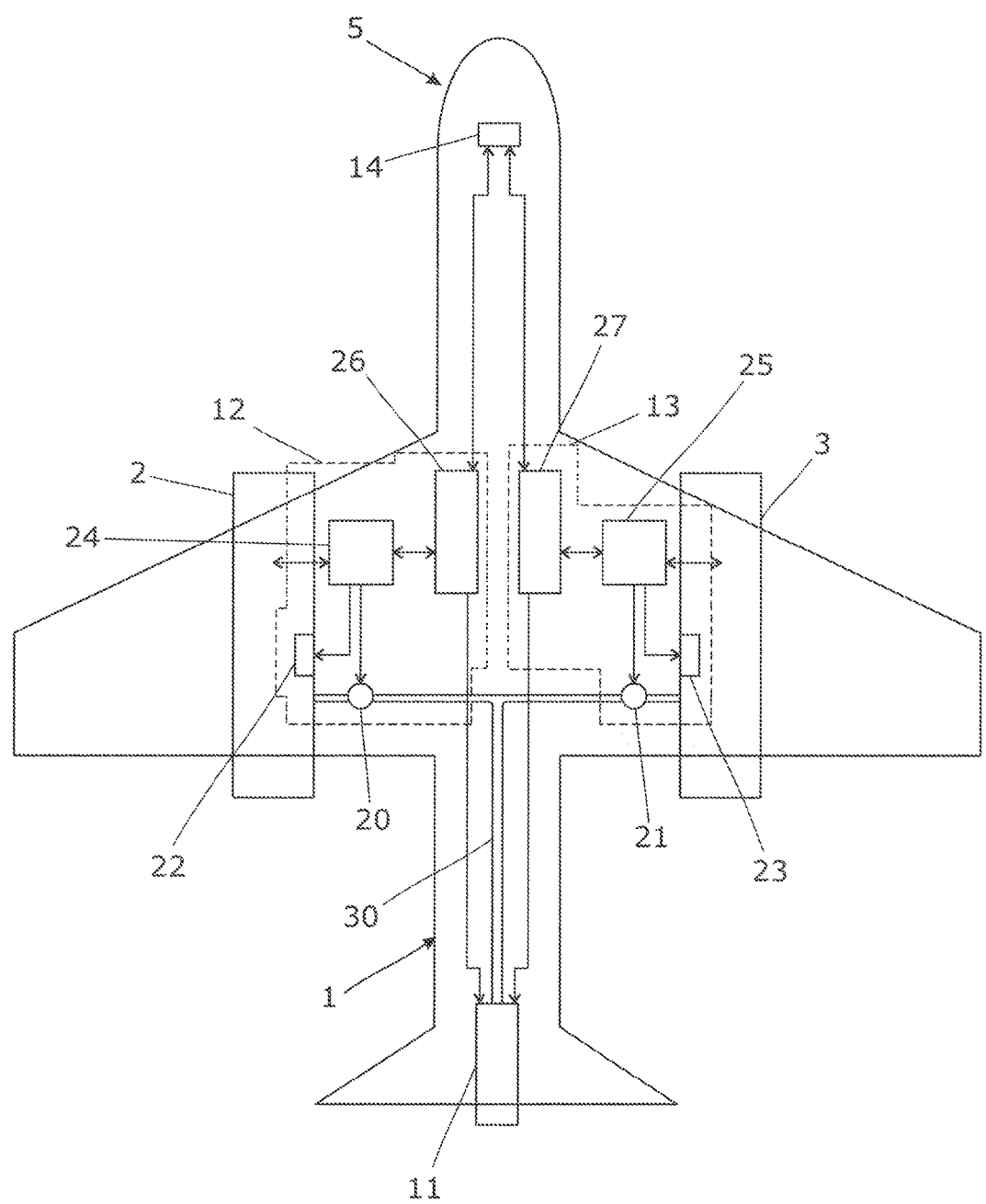
FIG. 2 is a schematic view of an onboard starting system in a twin-engine aircraft for implementing the engine starting method according to the invention.

With reference to FIGS. 1a and 1b, the invention comprises a method for the automatic starting of the engines 2, 3 of a twin-engine aircraft 1.

The term "automatic starting" means the spinning-up of at least one rotor of the high-pressure stage of one engine according to a starting cycle in four successive phases (see FIG. 1a) with:

a first phase (P1), referred to as the starting phase, during which the rotor of the high-pressure stage (N2) of the engine is spun up notably via an injection of external compressed air;

a second phase (P2), referred to as the holding phase, during which the rotational speed of the rotor is kept substantially constant and equal, for example, to substantially 10% of a nominal value. This phase lasts until the data from sensors (vibration, temperature) installed on the engine indicate that there is no longer any residual thermal gradient in the rotor of the engine. When the sensors are vibration sensors informing as to the presence of vibration of the engine when the rotor is spun up, the absence of vibration logged by the sensors indicates that the residual thermal gradient at the engine rotor has disappeared;

a third phase (P3), referred to as the ignition phase, during which the rotational speed of the rotor is increased, for example up to a value of approximately 30% of the nominal value. At around about the 30% value, fuel is injected into the engine and then the air-fuel mixture is ignited to generate a combustion of the mixture and lead to autonomous operation of the engine by expansion of the combustion gases; and a fourth phase (P4), referred to as the run-up phase, during which the injection of compressed air is stopped and the rotational speed of the rotor increases up to the nominal value.

When the starting cycle for the two engines 2, 3 is complete, the rotor of the high-pressure stage (N2) of the first engine and the rotor of the high-pressure stage (N2) of the second engine are rotating at the same speed (i.e., nominal speed).

When a first engine 2 is made by the pilots of the aircraft to follow an automatic starting procedure, this engine follows the conventional four-phase starting cycle with phases (P1-P4) as described above. According to the invention, the rotor of the high-pressure stage of the second engine 3 is spun up (i.e.: the starting phase P1' and holding phase P2' are applied to the second engine) for a predetermined duration and at a speed that is substantially constant and less than the nominal value, during the starting cycle for the first engine 2.

Once the starting cycle for the first engine 2 is complete, the second engine 3 is made by the pilots of the aircraft to follow an automatic starting procedure. The starting cycle for the second engine, referred to as the modified starting cycle, comprises only three phases, namely the starting (P1'), ignition (P3') and run-up (P4') phases as described above. The modified starting cycle for the second engine therefore does not include the holding phase (P2') because this phase has been carried out during the starting cycle for the first engine. In the remainder of the description, the modified starting cycle will be referred to as "short starting cycle" whereas the starting cycle comprising four phases will be referred to as the "normal starting cycle".

With reference to FIG. 2, the logic according to the invention is performed by a starting system that starts the engines of the aircraft 1. This system conventionally comprises a compressed-air-generating source 11, for example the APU (auxiliary power unit), a first and a second engine system 12, 13, these respectively being dedicated to the operation of the first 2 and of the second 3 engine, and a man-machine interface 14 installed in the cockpit 5 of the aircraft and allowing the pilots to initiate the starting of the engines.

An engine system 12, 13 comprises a pneumatic unit 20, 21 notably made up of one or more valves making it possible to regulate an air flow, a starting system 22, 23 made up of fuel injectors and of igniters of the igniter plug type, an engine control unit 24, 25 (FADEC) controlling the engine and the components (pneumatic unit and starting system) necessary for implementing its starting cycle on the basis of data emanating from sensors (not depicted) installed on the engine, and an interface unit 26, 27 (EIU for engine interface unit) allowing the engine system to communicate with the other systems of the aircraft.

The engine control unit 24, 25 is connected, for example by wired connections in accordance with standard ARINC429, to the engine 2-3, to the pneumatic unit 20, 21 and to the starting system 22, 23. The interface unit 26, 27 is connected, for example by wired connections in accordance with standard ARINC429, to the engine control unit 24, 25, to the compressed-air-generating source 11, to the man-machine interface 14 and to the interface unit 27, 26 of the other engine system.

Advantageously, the signal transmitted by one interface unit 26, 27 of one engine system 12, 13 to the interface unit 27, 26 of the other engine system 13, 12 comprises a bit indicative of activation of a holding phase (P2, P2') of an automatic starting cycle for starting the engine. Thus, the signal transmitted by the interface unit 26 of the engine system of the first engine 12 comprises a bit MSLENG1 which is set to 1 when the rotational speed of a rotor of the first engine 2 is held substantially constant and less (for example representing substantially 10%) than the nominal value, and to 0 when it is not. Symmetrically, the signal transmitted by the interface unit 27 of the engine system of the second engine 13 comprises a bit MSLENG2 which is set to 1 when the rotational speed of a rotor of the second engine 3 is held substantially constant and less (for example representing substantially 10%) than the nominal value, and to 0 when it is not.

Furthermore, the signal transmitted by an interface unit 26, 27 to the control unit 24, 25 of one and the same engine system 12, 13 comprises a bit indicative of activation of a short starting cycle. Thus, within one and the same engine system 12, 13, the signal transmitted by the interface unit 26, 27 to the control unit 24, 25 comprises a bit MS OFF which is set to 1 when the starting cycle that is to be implemented by the control unit is the short starting cycle, and to 0 when it is not.

The air-generating source 11 generates a flow of compressed air which is sent along piping 30 to the inlet of a turbine (not depicted) of each engine 2, 3 through the pneumatic unit 20, 21 of the engine system 12, 13 associated with the engine. The turbine at output produces mechanical work that allows at least one rotor of the high-pressure stage of the engine 2, 3 to turn. The pneumatic unit 20, 21 regulates the flow of air entering the turbine so as to regulate the rotational speed of the rotor of the engine 2, 3.

A method for the automatic starting of the engines 2, 3 of a twin-engine aircraft 1 using the starting system according to the invention will now be described.

In a first step, the pilots act on the man-machine interface 14 installed in the cockpit 5 to order a first engine 2 to perform an automatic start. The interface unit 26 of the first engine system 12 receives a signal from the man-machine interface 14 that the first engine 2 has been set to follow an automatic starting procedure. In response, the interface unit 26 sends a signal with the bit MSOFF set to 0 to the control unit 24 of the first engine system which implements the normal starting cycle for the first engine. To this end, said control unit 24 commands the pneumatic unit 20 of the first engine system 12 to allow air from the air-generating source 11 to be sent to the turbine of the engine 2 and the starting (P1) and holding (P2) phases are implemented in respect of the first engine 2. It should be noted that the holding phase (P2) of the normal starting cycle implemented has a duration that is calculated by the control unit 24 of the first engine 2.

In a second step, during implementation of the holding phase (P2) of the starting cycle for the first engine 2, the bit MSLENG1 of the signal transmitted by the interface unit 26 of the first engine system 12 to the interface unit 27 of the second engine system 13 is set to 1.

In a third step E3, in response to the new status of the signal MSLENG1 (bit set to 1), the interface unit 27 of the second engine system 13 transmits a signal to the control unit 25 of the second engine system 13 which implements a starting phase (P1') then a holding phase (P2'). To do that, the control unit 25 commands the pneumatic unit 21 of the second engine system 13 to send air from the air-generating source 11 to the turbine of the second engine 3. It should be noted that the holding phase (P2') implemented in respect of the second engine 3 has a duration determined by the control unit 25 of the second engine system 13 and may thus have a different duration from the holding phase (P2) implemented in respect of the first engine 2. During implementation of the holding phase (P2') for the second engine 3, the bit MSLENG2 is set to 1.

When the control unit 24 of the first engine system 12 determines that implementation of the holding phase (P2) for the first engine 2 is complete, the bit MSLENG1 is set to 0. Similarly, when the control unit 25 of the second engine system determines that the implementation of the holding phase (P2') for the second engine 3 is complete, the bit MSLENG2 is set to 0.

In a step E4, when the holding phase (P2, P2') is complete for both engines (the two bits MSLENG1 and MSLENG2 have the value 0), the interface unit 27 of the second engine system 13 sends a signal to the control unit 25 which then commands the pneumatic unit 21 to stop sending compressed air to the second engine 3. As a result, the rotor of the high-pressure stage of the second engine 3 is no longer driven. On the other hand, the normal starting cycle is continued for the first engine 2.

Thus, in a step E5, the ignition phase (P3) of the normal starting cycle is implemented for the first engine 2. The control unit 24 commands the pneumatic unit 20 of the first engine system 12 in such a way as to increase the rotational speed of the rotor of the high-pressure stage of the first engine 2 up to a value of approximately 30% (for example) and then commands the ignition unit 22 of the first engine system to inject fuel into the engine and then ignite it.

In a step E6, the run-up phase (P4) of the normal starting cycle is implemented: once the rotor of the first engine 2 is rotating under the action of the expansion of the gases resulting from the combustion of the air-fuel mixture, the control unit 24 of the first engine system 12 commands the pneumatic unit 20 to stop sending compressed air to the rotor of the first engine 2. The first engine 2 thereafter reaches the nominal rotational value.

In a step E7, once the first engine 2 has started, the pilots act on the man-machine interface 14 to order the automatic starting of the second engine 3. The automatic starting procedure may be ordered as soon as the first engine reaches the end of the run-up phase (P4) or a few minutes after the end of this phase.

The interface unit 27 of the second engine system 13 receives a signal from the man-machine interface 14 whereby the second engine 3 is made to follow an automatic starting procedure. In response, the interface unit 27 sends a signal with the bit MSOFF set to 1 to the control unit 25 of the second engine system 13 so that the latter starts a short starting cycle for the second engine 3 if the time between the end of the normal starting cycle for the first engine and the receipt, by the interface unit 27, of the signal from the man-machine interface 14 whereby the second engine 3 is made to follow an automatic starting procedure is less than a predetermined duration, for example lasting from 1 hour to 1 and a half hours. If the time exceeds the predetermined duration, the second engine is started in accordance with a normal starting cycle (the interface unit 27 sends a signal with the bit MSOFF set to 0 to the control unit 25 of the second engine system 13).

In response to this signal, said control unit 25 commands the pneumatic unit 21 of the second engine system 13 to allow air from the air-generating source 11 to be sent to the turbine of the second engine 3 to implement the starting phase (P1') of the short starting cycle.

Next, in a step E8, the control unit 25 implements the ignition phase (P3') of the short starting cycle. To do so, the control unit 25 commands the pneumatic unit 21 of the second engine system 13 in such a way as to increase the rotational speed of the rotor of the second engine 3 up to a value of around 30% (for example), then commands the ignition unit 23 of the second engine system 13 to inject fuel into the engine 3 and then ignite it.

In a step E9, the control unit 25 implements the run-up phase (P4') of the short starting cycle once the rotor of the second engine 3 is rotating under the action of the expansion of the gases resulting from the combustion of the air-fuel mixture. To do that, the control unit 25 of the second engine system 13 commands the pneumatic unit 21 so that the latter stops sending compressed air to the second engine 3. The second engine 3 thereafter reaches the nominal rotational value.

After these steps, the two engines 2, 3 of the aircraft 1 are running and the aircraft is ready for takeoff.

The invention, by performing a short starting cycle on the engine that is started second, makes it possible to reduce the time for which the airplane is immobilized on the ground between two flights down to five minutes. The preventive implementation of a holding phase in the short starting cycle for the second engine makes the process reliable and safe because, despite a shorter start, the deformation phenomena of the "bowed rotor" type are avoided.

As an alternative to the embodiment described hereinabove, the compressed-air-generating source 11 is a compressor external to the aircraft. Furthermore, although not described, each interface unit 26, 27 of an engine system 12, 13 is in communication with the compressed-air-generating source 11 and a computer allows the mode of operation of the compressed-air source 11 to be adapted according to the pneumatic load thereon so as to be able, in particular, to supply both engines 2, 3 with compressed air simultaneously.

In an alternative form of the invention, the interface units (26, 27) of the engine systems are not interconnected but rather it is the control units (24, 25) of the two engine systems that are interconnected and that ensure communication between said two systems. In that case, the signal transmitted by a control unit of one engine system to the control unit of the other engine system comprises a bit indicative of activation of a holding phase (P2, P2') of an automatic starting cycle for starting the engine.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for the automatic starting of a twin-engine aircraft, the aircraft comprising a first and a second engine each having a high-pressure stage comprising at least one rotor, the starting method comprising the automatic starting of a first and then of a second engine, the starting of the first engine comprising implementing a starting cycle that takes place in four successive phases, these being:
- a starting phase in which at least one rotor of the high-pressure stage of the first engine is spun up via a compressed-air-generating source;
- a holding phase in which the rotational speed of the at least one rotor of the first engine is held at a speed that is substantially constant and less than a nominal value for a predetermined duration;
- an ignition phase in which combustion of an air-fuel mixture is initiated in the first engine; and
- a run-up phase in which the rotational speed of the at least one rotor of the first engine is increased until it reaches the nominal value, the method being one wherein, concomitantly with the starting cycle for the first engine, comprises the steps of:

spinning up at least one rotor of the high-pressure stage of the second engine for a predetermined duration, using the compressed-air-generating source, to a speed that is substantially constant and less than the nominal value, and wherein, once the run-up phase of the starting cycle for the first engine is complete, the second engine is started, the starting of the second engine comprises implementing a starting cycle that takes place in three successive phases, these being:
- a starting phase in which at least one rotor of the high-pressure stage of the second engine is spun up via a compressed-air-generating source;
- an ignition phase in which combustion of an air-fuel mixture is initiated in the second engine; and
- a run-up phase in which the rotational speed of the at least one rotor of the second engine is increased until it reaches the nominal value.

2. The method for the automatic starting of a twin-engine aircraft as claimed in claim 1, wherein the ignition phase of the starting cycle for the first engine is implemented following expiry of the duration during which the at least one rotor of the high-pressure stage of the second engine is spun up to a speed that is substantially constant and less than the nominal value.

3. A system for starting the engines of a twin-engine aircraft configured to implement the method for the automatic starting of a twin-engine aircraft as claimed in claim 1, the aircraft having a first and a second engine each having a high-pressure stage comprising at least one rotor, and a compressed-air-generating source for spinning up the at least one rotor of each of said engine systems, the starting system further comprising:
- a first and a second engine system respectively associated with the first and with the second engine,
  - each engine system comprising an engine control unit connected to the engine and configured to control said engine, and
- an interface unit connected to said control unit and connected to said source,
- wherein the two engine systems are connected to one another.

4. The starting system as claimed in claim 3, wherein a signal transmitted by the first engine system to the second engine system comprises a bit indicative of activation of a holding phase during which the rotational speed of the at least one rotor of the first engine is held at a speed that is substantially constant and less than a nominal value for a predetermined duration, and wherein a signal transmitted by the second engine system to the first engine system comprises a bit indicative of activation of a holding phase during which the rotational speed of the at least one rotor of the second engine is held at a speed that is substantially constant and less than the nominal value for a predetermined duration.

5. The starting system as claimed in claim 3, wherein a signal transmitted by an interface unit of an engine system associated with an engine to the control unit of said engine system comprises a bit indicative of the activation of a starting cycle that takes place in three successive phases, these being:
- a starting phase in which at least one rotor of the high-pressure stage of the engine is spun up via a compressed-air-generating source;
- an ignition phase in which combustion of an air-fuel mixture is initiated in the engine; and
- a run-up phase in which the rotational speed of the at least one rotor of the engine is increased until it reaches the nominal value.

6. The starting system as claimed in claim 3, wherein the control unit of the first engine system is connected to the control unit of the second engine system.

7. The starting system as claimed in claim 3, wherein the interface unit of the first engine system is connected to the interface unit of the second engine system.

* * * * *